United States Patent [19]

Yaotani

[11] Patent Number: 6,104,386
[45] Date of Patent: Aug. 15, 2000

[54] COORDINATE INPUT DEVICE

[75] Inventor: Takeshi Yaotani, Fukushima-ken, Japan

[73] Assignee: Alps Electric Co., Ltd., Tokyo, Japan

[21] Appl. No.: 09/026,568

[22] Filed: Feb. 20, 1998

[30] Foreign Application Priority Data

Feb. 21, 1997 [JP] Japan ................................ 9-037932

[51] Int. Cl.$^7$ .................................................. G09G 5/00
[52] U.S. Cl. ................... 345/173; 178/18.01; 178/18.06
[58] Field of Search .................................. 382/125, 124, 382/151, 291, 288; 178/18.01, 18.03, 18.06, 18.02; 345/173, 179, 174, 175; 348/87; 395/200.33

[56] References Cited

U.S. PATENT DOCUMENTS

| | | | |
|---|---|---|---|
| 4,186,412 | 1/1980 | Arimura | 348/87 |
| 5,412,161 | 5/1995 | Crooks et al. | 178/18.02 |
| 5,414,413 | 5/1995 | Tamaru et al. | 345/175 |
| 5,546,538 | 8/1996 | Cobbley et al. | 395/200.33 |
| 5,831,600 | 11/1998 | Inoue et al. | 345/173 |
| 5,861,583 | 1/1999 | Schediwy et al. | 178/18.06 |
| 5,861,875 | 1/1999 | Gerpheide | 345/174 |
| 5,869,790 | 2/1999 | Shigetaka et al. | 178/18.03 |
| 5,877,458 | 3/1999 | Flowers | 178/18.01 |
| 5,880,411 | 3/1999 | Gillespie et al. | 178/18.01 |
| 5,889,236 | 3/1999 | Gillespie et al. | 178/18.01 |

*Primary Examiner*—Amelia Au
*Assistant Examiner*—Vikkram Bali
*Attorney, Agent, or Firm*—Brinks Hofer Gilson & Lione

[57] ABSTRACT

A coordinate input device of a low manufacturing cost is to be provided using a position detector and an arithmetic unit of simple configurations. The coordinate input device comprises a contact type coordinate detecting section provided with a first substrate having a plurality of X electrodes arranged in parallel in X-axis direction and a second substrate having a plurality of X electrodes arranged in parallel in X-axis direction, the first and second substrates being disposed in proximity to each other, and some of the X and Y electrodes being rendered conductive by a pushing operating of an operating means, a scanning section which provides scanning signals successively to the X electrodes, a position detecting section which outputs detection signals from the Y electrodes during scanning of the X electrodes, and an arithmetic section which calculates X and Y coordinate positions on the basis of both scanning signals and detection signals. The X and Y coordinate positions calculated by the arithmetic section correspond to central coordinate positions operated by the operating means and detected from the differences between conducted maximum X, Y coordinate positions and minimum X, Y coordinate positions.

3 Claims, 3 Drawing Sheets

COORDINATE INPUT DEVICE

BACKGROUND OF THE INVENTION

1. Field of the Invention

The present invention relates to a coordinate input device and more particularly to a coordinate input device wherein a coordinate position detected by a contact type coordinate detecting section adapted to be pushed by an operating means such as a finger can be calculated easily by an arithmetic operation performed by a coordinate position calculating circuit.

2. Description of the Related Art

Heretofore, in a signal processor such as a personal computer there has been used a coordinate input device provided with a capacitance detection type coordinate detecting section which is operated by an operating means such as a finger.

FIG. 3 is a block diagram showing an example of a schematic configuration of such a known coordinate input device.

As shown in FIG. 3, the coordinate input device illustrated therein comprises a capacitance detection type coordinate detecting section 31 having a plurality(n number) of X electrodes $3_{21}$ to $32_n$ arranged in parallel in X-axis direction and a plurality (m number) of Y electrodes $3_{31}$ to $33_m$ arranged in parallel in Y-axis direction, an operating means 34, for example a finger of an operator, for operating a desired coordinate position on an operating surface of the coordinate detecting section 31, a drive signal generating section 35 for providing drive signals to the X electrodes $32_1$~$32_n$, a position detecting section 36 which outputs as an electric current a change in capacitance of Y electrodes $33_1$ to $33_m$ which is caused upon operation by the operating means 34, an arithmetic section 37 which, on the basis of the drive signals and changes in electric current, calculates the coordinate position on the operating surface of the coordinate detecting section 31 having been operated by the operating means 34 and then outputs coordinate position data, a data output section 38 which converts the coordinate position data into a signal suitable for transmission, and a control section 39 for controlling the operation of the entire coordinate input device.

The known coordinate input device constructed as above generally operates as follows.

In the capacitance detection type coordinate detecting section 31, the X electrodes $32_1$ to $32_n$ are scanned successively with drive signals outputted from the drive signal generating section 35, and electric currents proportional to capacitance values in Y electrodes $33_1$ to $33_m$ are detected successively by the position detecting section 36. In this state, when the operator operates a desired position on the operating surface of the coordinate detection section 31 with his or her finger 34, there occurs changes in the value of capacitance of the operated Y electrodes $33_1$, and the changes in capacitance are detected as changes in electric current by the position detecting section 36, which in turn outputs electric current values. In accordance with the control signal fed from the control section 39 and the electric current values provided from the position detecting section 36, the arithmetic section 37 calculates, as coordinate position data, both X and Y coordinate positions where the change in capacitance value is the largest. The data output section 38 converts the coordinate position data obtained in the arithmetic section 37 into a transmission signal suitable for transmission, which signal is then transmitted to a signal processing means(not shown) such as a personal computer through a connection line or by wireless means such as infrared light or radio.

Since the above known coordinate input device detects a delicate change in capacitance between X electrode ($32_1$~$32_n$) and Y electrode ($33_1$~$33_m$) upon contact therewith of the operating means 34 and then calculates coordinate position data, it requires an amplifier circuit for amplifying the change in capacitance, a processing circuit for processing against disturbance noise, and a complicated arithmetic processing circuit. Thus, there arises the problem that the manufacturing cost of the coordinate input device becomes high.

SUMMARY OF THE INVENTION

The present invention solves the above-mentioned problem and it is an object of the invention to provide a coordinate input device of a low manufacturing cost wherein coordinate position data are calculated by a simple processing circuit without using capacitance detecting means or the like.

In order to achieve the above-mentioned object, the coordinate input device of the present invention comprises a contact type coordinate detecting section which causes X and Y electrodes to come into contact with each other, a scanning section for scanning X electrodes, a position detecting section for detecting detection signals provided from Y electrodes, and an arithmetic section for calculating X and Y coordinate positions, the arithmetic section being provided with means for detecting central coordinate positions operated by the operating means on the basis of differences between maximum coordinate positions of conducted X, Y electrodes and minimum coordinate positions thereof.

According to the above-mentioned means, X and Y coordinate positions detected upon pushing the operating surface of the contact type coordinate detecting section correspond respectively to a central X coordinate position based on the difference between conducted maximum and minimum coordinate positions and a central Y coordinate position based on the difference between conducted maximum and minimum Y coordinate positions, and a plurality of conducted positions of X and Y electrodes are detected and the respective central coordinate positions are used as position data. Therefore, a position data processing circuit of a simple structure suffices and hence it is possible to provide a coordinate input device of a low manufacturing cost.

The coordinate input device according to the present invention comprises a contact type coordinate detecting section provided with a first substrate having a plurality of X electrodes arranged in parallel in X-axis direction and a second substrate having a plurality of Y electrodes arranged in parallel in Y-axis direction, the first and second substrates being disposed in proximity to each other, plural such X and Y electrodes being rendered conductive by a pushing operation of an operating means, a scanning section which provides scanning signals successively to the X electrodes, a position detecting section which outputs the scanning signals as detection signals of Y electrodes during scanning of X electrodes, and an arithmetic section for calculating X and Y coordinate positions on the basis of the scanning signals and the detection signals. The X and Y coordinate positions calculated by the arithmetic section correspond to central coordinate positions operated by the operating means and detected from the differences between conducted maximum X,Y coordinate positions and minimum X,Y coordinate positions.

For example, the operating means is a finger of an operator.

Preferably, the arithmetic section stores the calculated central coordinate positions successively in an internal memory and, on the basis of a shifting state of the central coordinate positions thus stored, detects movement data indicative of a moving speed and/or a moving direction of the contact type coordinate detecting section operated by the operating means.

Preferably, when there is no change in the detected movement data, the arithmetic section detects switch data based on a tapping operation of the operating means.

According to the above embodiments of the present invention, X and Y coordinate positions on the operating surface of the contact type coordinate detecting section detected upon pushing operation by the operating means correspond respectively to a central X coordinate position calculated by the arithmetic section on the basis of the difference between conducted maximum and minimum X coordinate positions and a central Y coordinate position calculated by the arithmetic section on the basis of the difference between conducted maximum and minimum Y coordinate positions. Therefore, as compared with a capacitance type coordinate input device, both a position detecting circuit and an arithmetic processing circuit are simplified in structure and it is possible to provide a coordinate input device of a low manufacturing cost.

DETAILED DESCRIPTION OF A PREFERRED EMBODIMENT

An embodiment of the present invention will be described hereinafter with reference to the accompanying drawings.

Figure 1:
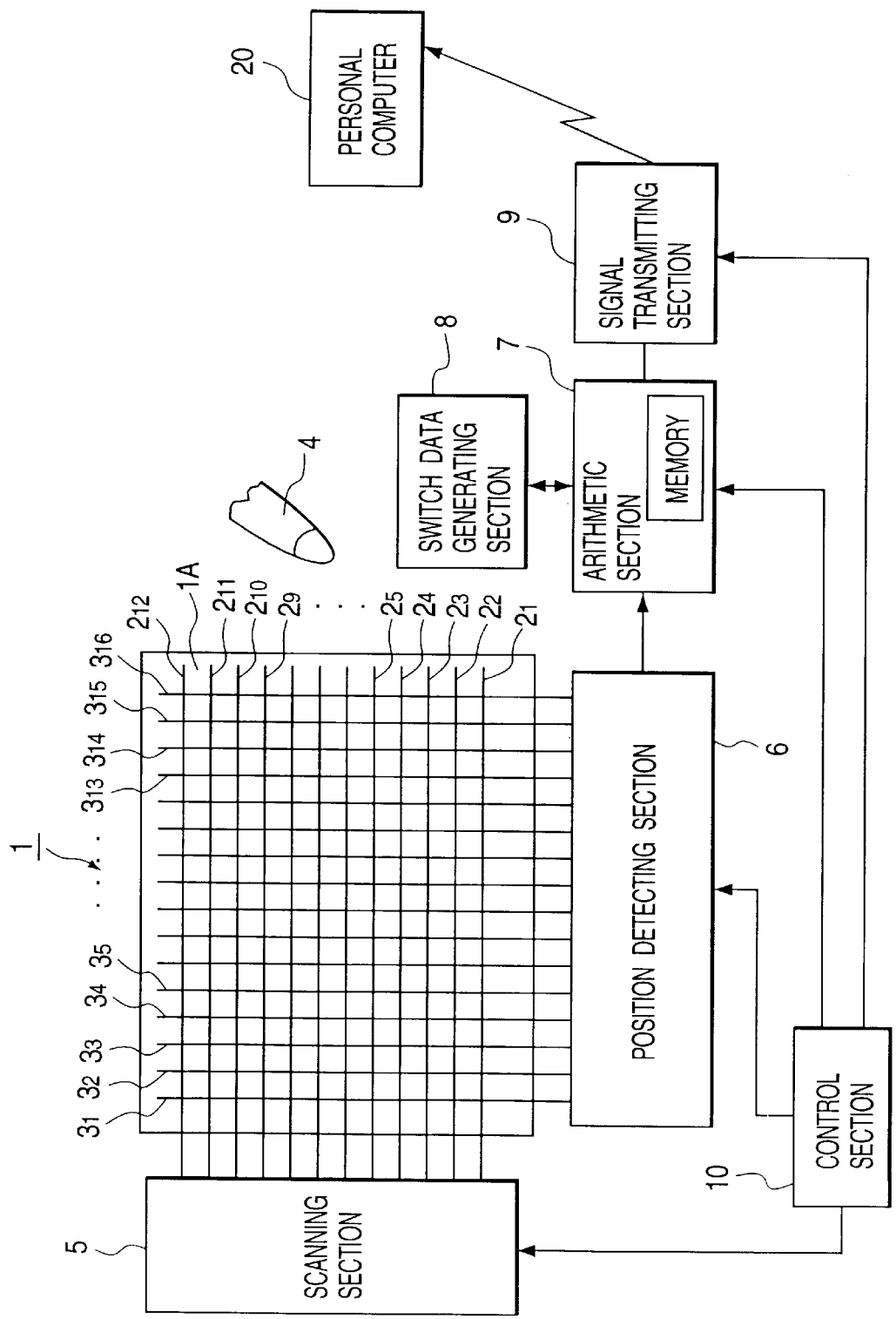
FIG. 1 is a block diagram of a coordinate input device according to an embodiment of the present invention.
Figure 2:
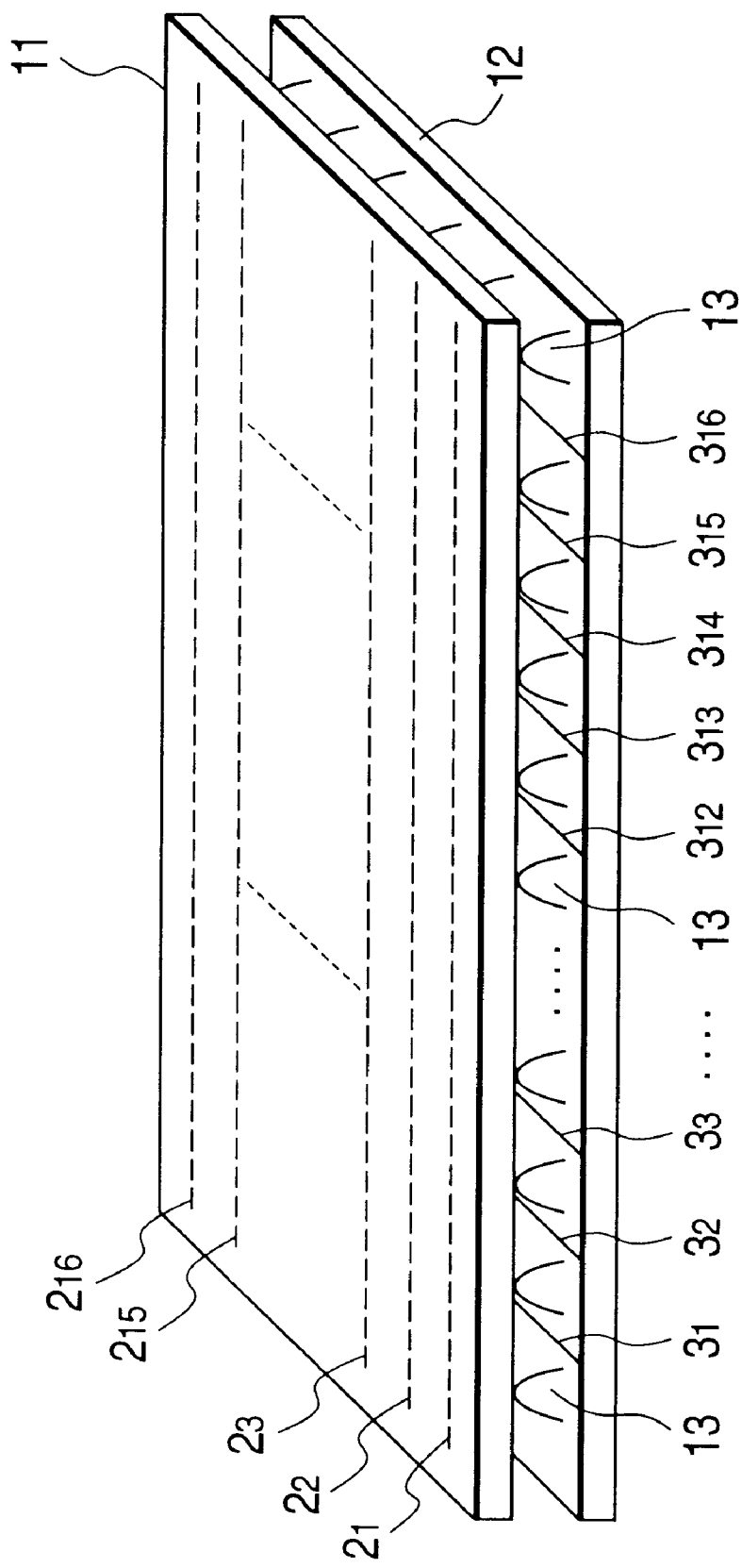
FIG. 2 is a perspective view showing an example of construction of a contact type coordinate detecting section used in the coordinate input device illustrated in FIG. 1.
Figure 3:
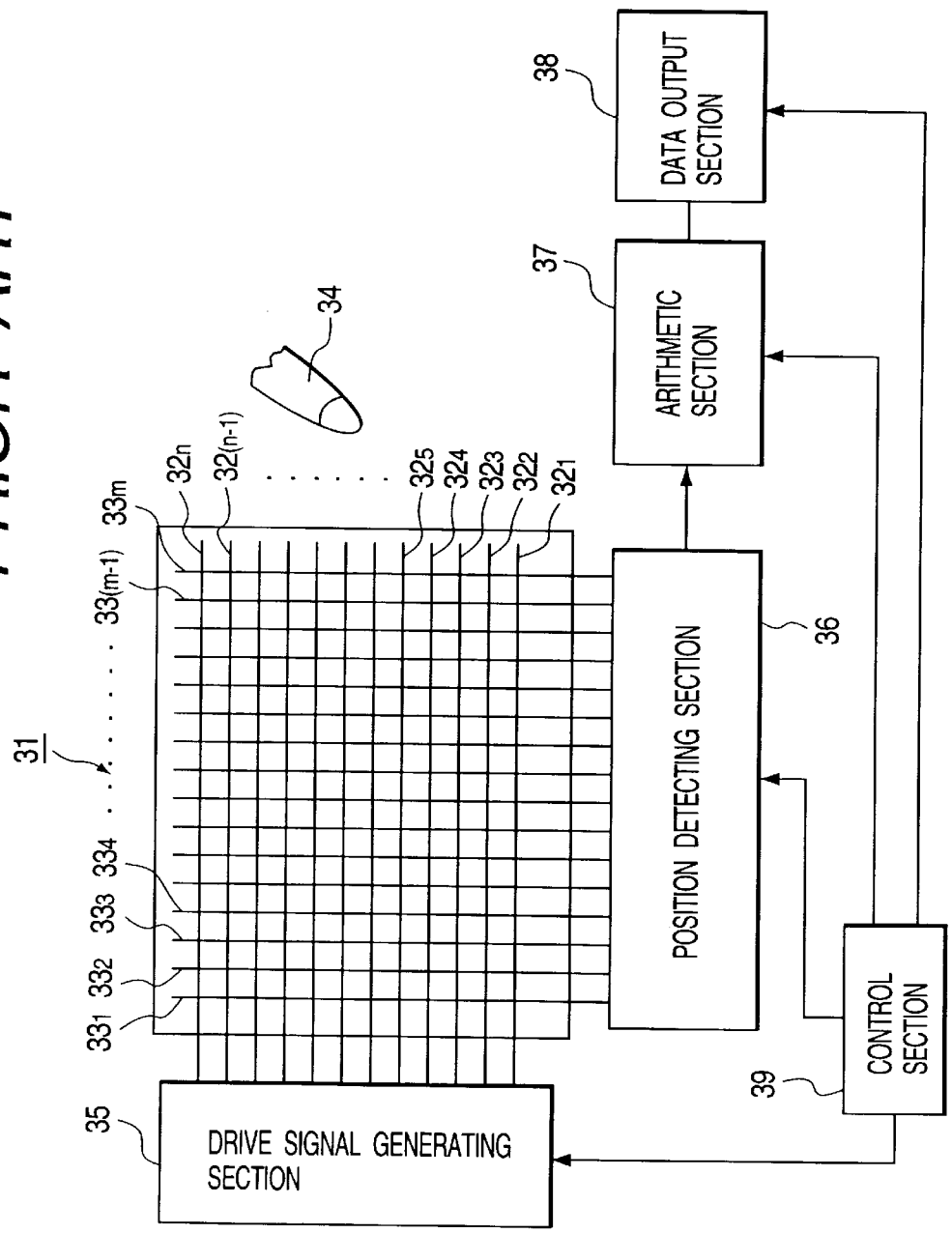
FIG. 3 is a block diagram showing schematically an example of construction of a known coordinate input device.

FIG. 1 is a block diagram showing a coordinate input device according to an embodiment of the present invention, and FIG. 2 is a perspective view showing an example of construction of a contact type coordinate detecting section used in the coordinate input device illustrated in FIG. 1.

As shown in FIG. 1, the coordinate input device of this embodiment comprises a contact type coordinate detecting section 1 having a plurality (twelve in this embodiment) of X electrodes $2_1$ to $2_{12}$ arranged in parallel in X-axis direction and a plurality (sixteen in this embodiment) of Y electrodes $3_1$ to $3_{16}$ arranged in parallel in Y-axis direction; an operating means 4, for example a finger of an operator, which performs operation for a desired coordinate position on an operating surface 1A of the contact type coordinate detecting section 1; a scanning section 5 which provides scanning signals successively to the twelve X electrodes $2_1$ to $2_{12}$; a position detecting section 6 for detecting one or more Y electrodes operated by the operating means 4 out of the sixteen Y electrodes and outputting detection signals; an arithmetic section 7 which, on the basis of the provided scanning signals and detection signals, calculates X and Y coordinate positions on the operating surface 1A of the contact type coordinate detecting section 1 operated by the operating means 4 and then outputs coordinate position data; an internal memory 7M incorporated in the arithmetic section 7 to store the coordinate position data temporarily; a switch data generating section 8 for generating switch data; a data output section 9 which converts the coordinate position data and the switch data into signals suitable for transmission to a personal computer (signal processor) 20; and a control section 10 for generally controlling the operation of each component of the coordinate input device.

As shown in FIG. 2, the contact type coordinate detecting section 1 comprises a flexible first substrate 11 and a flexible second substrate 12, which are opposed to each other at a slight distance through spacers 13, twelve X electrodes $2_1$ to $2_{12}$ formed in parallel on the first substrate 11, and sixteen Y electrodes $3_1$ to $3_{16}$ formed in parallel on the second substrate 12.

The coordinate input device of this embodiment constructed as above operates in the following manner.

In the contact type coordinate detecting section 1, the twelve X electrodes $2_1$ to $2_{12}$ are successively scanned continually with scanning signals outputted from the scanning section 5, and the sixteen Y electrodes $3_1$ to $3_{16}$ are connected to the position detection section 6. In this state, if the operator pushes a desired position on the operating surface 1A of the coordinate detecting section 1, using his or her finger (operating means), the slight distance between the first and second substrates 11, 12 changes partially at the position pushed with the finger 4, and plural X electrodes and plural Y electrodes come into contact and conduction with each other on the basis of such partial change. This conduction causes scanning signals to flow through the Y electrodes, which signals are detected by the position detecting section 6 and outputted as detection signals from the same section. Then, the arithmetic section 7 receives from the control section 10 signals indicating the state of supply of scanning signals fed to the twelve X electrodes $2_1$ to $2_{12}$, and at the same time receives the detection signals provided from the position detecting section 6. On the basis of these signals, the arithmetic section 7 determines the largest X coordinate position Xmax and the smallest X coordinate position Xmin out of the X coordinate positions conducted and likewise determines the largest Y coordinate positions Ymax and the smallest Y coordinate positions Ymin out of the Y coordinate positions conducted. Thereafter, the arithmetic section 7 calculates $\{(Xmax-Xmin)/2\}+Xmin$ to obtain a central X coordinate position and also calculates $\{(Ymax-Ymin)/2\}+Ymin$ to obtain a central Y coordinate position, then outputs the central X and Y coordinate positions thus obtained as position detection data. The signal transmitting section 9 converts the coordinate position data outputted from the arithmetic section 7 into transmission signals suitable for transmission to the personal computer 20, which are infrared transmission signals in the illustrated example, and transmits the thus-converted infrared transmission signals to the personal computer 20 by wireless.

Further, the arithmetic section attains the following functions in accordance with the position coordinate data thus calculated.

The first function is to store new position coordinate data temporarily in the internal memory 7M at every calculation of position coordinate data.

The second function is to compare new position detection data with several immediately preceding position detection data already stored in the internal memory 7M and, when it is judged that there has been a shift in operating position based on operation with the finger 4 between such position detection data, to form movement data representing a moving direction and a moving speed of the positional shift and to output the a movement data together with new position detection data.

The third function is to compare new position detection data with several immediately preceding position detection data already stored in the internal memory 7M and, when there is no change between such position detection data, to drive the switch data generating section 8 on the assumption that a tapping operation has been performed, to allow switch data to be generated from the switch data generating section 8, and to output the switch data instead of new position detection data.

Thus, according to the coordinate input device of this embodiment, detected X and Y coordinate positions on the operating surface 1A of the contact type coordinate detecting section 1 correspond respectively to a central X coordinate position calculated by the arithmetic section 7 on the basis of the difference between conducted maximum X coordinate position Xmax and minimum X coordinate position Xmin and a central Y coordinate position also calculated by the arithmetic section on the basis of the difference between conducted maximum Y coordinate position Ymax and minimum X coordinate position Ymin. In this way coordinate position data are calculated by only the detecting section for the detection of scanning signals based on conduction and the arithmetic section which calculates the center between maximum and minimum values. Therefore, the processing circuit used can be simplified in structure.

Although in the above embodiment the number of X electrodes $X_1$ to $X_{12}$ and that of Y electrodes $Y_0$ to $Y_{16}$, as constituents of the contact type coordinate detecting section 1, are twelve and sixteen, respectively, no limitation is placed thereon. The X and Y electrodes are not always required to be arranged perpendicularly to each other.

Although in the above embodiment the operating means 4 for operating the operating surface 1A of the contact type coordinate detecting section 1 is a finger of the operator, this constitutes no limitation. For example, it may be a pen-shaped operating means.

Further, although in the above embodiment the signal processor supplied with transmission signals from the coordinate input device is the personal computer 20 and the transmission signals are transmitted as infrared signals by wireless, this constitutes no limitation. The signal processor to which transmission signals are to be transmitted may be any other signal processor than the personal computer, and the transmission signals may be in any other form than infrared signals.

According to the coordinate input device of the present invention, as set forth above, X and Y coordinate positions on the operating surface of the contact type coordinate detecting section detected upon pushing of the operating surface of the operating means corresponds respectively to a central X coordinate position calculated by the arithmetic section from the difference between conducted maximum and minimum X coordinate positions and a central Y coordinate position calculated by the arithmetic section from the difference between conducted maximum and minimum Y coordinate positions. Therefore, it suffices to use only a position detecting section of a simple structure for detection of scanning signals and an arithmetic section also of a simple structure for the calculation of central coordinates based on the difference between maximum and minimum coordinate positions. This is effective in reducing the manufacturing cost.

What is claimed is:

1. A coordinate input device comprising:
    a contact type coordinate detecting section provided with a first substrate having a plurality of X electrodes arranged in parallel in a X-axis direction and a second substrate having a plurality of Y electrodes arranged in parallel in a Y-axis direction, said first and second substrates being disposed in proximity to each other, said X electrodes and said Y electrodes being rendered conductive at a plurality of locations through a pushing operation of an operating means;
    a scanning section for providing in sequence a scanning signal to said X electrodes;
    a position detecting section for outputting said scanning signal as a detecting signal of the Y electrodes when said X electrodes are scanned; and
    an arithmetic section for calculating a central position of said X electrodes and a central position of said Y electrodes on the basis of said scanning signal and said detecting signal, wherein said central position of said X electrode is calculated by the equation {(Xmax−Xmin)/2}+Xmin, said Xmax being a maximum conductive X electrode and Xmin being a minimum conductive X electrode selected from said plurality of conductive locations, and said central position of said Y electrode is calculated by the equation {(Ymax−Ymin/2}+Ymin, said Ymax being a maximum conductive Y electrode and Ymin being a minimum conductive Y electrode selected from said plurality of conductive locations, said central position of said X electrode and said central position of said Y electrode being outputted as new position detecting data coordinate and being temporarily stored in an internal memory further wherein said arithmetic section compares said new position detecting coordinate with a preceding position detecting data coordinate stored in said internal memory to determine any shift in said plurality of conductive locations, any said shift being outputted as a moving direction and a moving speed.

2. A coordinate input device according to claim 1, wherein said operating means is a finger of an operator.

3. A coordinate input device according to claim 1, wherein said arithmetic section generates a switch data from a switch data generating section when said arithmetic section determines that there has been no shift in said plurality of conductive locations between successive calculations of said central position of said X electrode and said central position of said Y electrode, said no shift in said plurality of conductive locations being interpreted as a tapping operating of said operating means, further wherein said switch data is output by said arithmetic section in place of said output of said new position detecting data coordinate.

* * * * *